United States Patent
Bergmann

(10) Patent No.: US 11,878,746 B2
(45) Date of Patent: Jan. 23, 2024

(54) STEER-BY-WIRE STEERING SYSTEM AND METHOD FOR OPERATING A STEER-BY-WIRE STEERING SYSTEM

(71) Applicant: ZF Automotive Germany GmbH, Alfdorf (DE)

(72) Inventor: Philipp Bergmann, Düsseldorf (DE)

(73) Assignee: ZF Automotive Germany GmbH, Alfdorf (DE)

( * ) Notice: Subject to any disclaimer, the term of this patent is extended or adjusted under 35 U.S.C. 154(b) by 53 days.

(21) Appl. No.: 17/120,488

(22) Filed: Dec. 14, 2020

(65) Prior Publication Data
US 2021/0179166 A1    Jun. 17, 2021

(30) Foreign Application Priority Data
Dec. 12, 2019   (DE) .......................... 102019134143.4

(51) Int. Cl.
*B62D 5/00*  (2006.01)
*B62D 5/04*  (2006.01)
*B62D 1/04*  (2006.01)

(52) U.S. Cl.
CPC ............... *B62D 5/046* (2013.01); *B62D 1/04* (2013.01); *B62D 5/003* (2013.01); *B62D 5/0481* (2013.01)

(58) Field of Classification Search
CPC ...................................................... B62D 5/003
USPC ......................................................... 180/446
See application file for complete search history.

(56) References Cited

U.S. PATENT DOCUMENTS

| | | | |
|---|---|---|---|
| 7,130,728 B2 * | 10/2006 | Suzuki ................... | B62D 6/008 180/413 |
| 9,254,863 B2 * | 2/2016 | Kuwahara ............ | B62D 5/0481 |
| 9,731,751 B2 * | 8/2017 | Kawamura .......... | B62D 15/021 |
| 11,014,603 B2 * | 5/2021 | Kozuka ............... | B62D 5/0481 |
| 2002/0033301 A1 | 3/2002 | Clephas | |
| 2003/0114969 A1 | 6/2003 | Dominke et al. | |

FOREIGN PATENT DOCUMENTS

WO    WO-2021049110 A1 *  3/2021

* cited by examiner

*Primary Examiner* — Kevin Hurley
*Assistant Examiner* — Hosam Shabara
(74) *Attorney, Agent, or Firm* — Robert James Harwood

(57) ABSTRACT

A steer-by-wire steering system for a vehicle is provided that includes a steering wheel actuator for moving and detecting movements of a steering wheel of the vehicle. The steering wheel actuator includes a steering wheel electric motor. The steer-by-wire steering system further includes an axle actuator for moving and detecting movements of wheels of an axle of the vehicle. The axle actuator includes an axle electric motor and an axle control unit. The steer-by-wire steering system an equivalent circuit, which measures a current induced by the steering wheel electric motor and provides the axle control unit with at least one measurement value depending on the induced current for controlling the axle electric motor.

15 Claims, 4 Drawing Sheets

STEER-BY-WIRE STEERING SYSTEM AND METHOD FOR OPERATING A STEER-BY-WIRE STEERING SYSTEM

RELATED APPLICATION

This application claims priority to German Patent Application No. 102019134143.4 filed Dec. 12, 2019, the disclosure of which is incorporated herein by reference in its entirety.

BACKGROUND OF THE INVENTION

The invention relates to a steer-by-wire steering system for a vehicle as well as a method for operating such a steer-by-wire steering system.

Steer-by-wire steering systems are characterized in that there is no longer a mechanical connection for transmitting a steering movement between the steering wheel of the vehicle and the steered wheels of the vehicle axle, typically the front axle. The driver's steering movement is transmitted via sensors, actuators, and control electronics.

To ensure sufficient reliability of the steering system, steer-by-wire steering systems typically have redundant systems. However, should there be a complete or partial failure of the steering system, in particular of the control electronics, it is necessary to continue to ensure that steering movements of the driver can be detected and implemented.

SUMMARY OF THE INVENTION

The object of the invention is to specify a steer-by-wire steering system, the reliability of which is further increased.

The object is achieved according to the invention by a steer-by-wire steering system for a vehicle with a steering wheel actuator for moving and detecting movements of the steering wheel, which has a steering wheel electric motor and which is connected to a steering wheel of the vehicle, an axle actuator for moving and detecting movements of wheels of an axle of the vehicle, which comprises an axle electric motor and an axle control unit and which is connected to an axle of the vehicle, and an equivalent circuit designed to measure current induced by the steering wheel electric motor and to provide the axle control unit with at least one measurement value depending on the induced current for the control of the axle electric motor.

The axle of the vehicle can be both the front and rear axles of the vehicle. However, the front axle of the vehicle is usually controlled by the steer-by-wire steering system.

The steering wheel electric motor and the axle electric motor are in particular three-phase machines, which are operated with three-phase alternating current.

As components of the steer-by-wire steering system, the steering wheel actuator and the axle actuator are not mechanically connected to each other for the transmission of the steering movement.

The measurement value is in particular a voltage that is processed by the axle actuator to perform a steering movement.

A basic idea of the invention is that the steering wheel electric motor can also work as a generator in the event of a failure of control electronics of the steer-by-wire steering system, so that a measurement value can be determined depending on the steering movement performed on the steering wheel even in the event of failure of the sensors. This measurement value is then transmitted to the axle control unit and thus ensures the operation of the steer-by-wire steering system.

For the detection of the current induced by the steering wheel electric motor, the equivalent circuit may have at least one current sensor, which is assigned to a phase of the steering wheel electric motor, in particular wherein the equivalent circuit has as many current sensors as the steering wheel actuator has phases.

The current sensors can also be sensors of another sensor system of the steering wheel actuator, which only measure the current induced by the steering wheel electric motor in the event of a partial or complete failure of the control electronics of the steer-by-wire steering system.

In particular, the steering wheel actuator has three phases and the equivalent circuit has three current sensors.

One variant provides as many measurement values as the steering wheel electric motor has phases. Thus, a separate measurement value is available to the axle actuator for each phase of the steering wheel electric motor, whereby the operation of the axle actuator can take place depending on each of the phases of the steering wheel electric motor. As a result, more reliable operation of the steer-by-wire steering system can be achieved.

In order to be able to carry out the operation of the steer-by-wire steering system even without an electronic control unit, the equivalent circuit may have a logic circuit, in particular wherein the equivalent circuit is purely a logic circuit.

A purely logic circuit has no microcontroller and therefore no software that would be necessary for the operation of the circuit. Thus, the steer-by-wire steering system according to the invention is also suitable for applications in which the control electronics fail completely.

In this case, the evaluation of the current signal is at least qualitative. However, this is sufficient to ensure the operation of the steer-by-wire steering system to a sufficient extent.

The axle control unit can be set up to record at least one measurement value and to control the axle electric motor on the basis of the at least one measurement value. In particular, the axle control unit is set up in this case to determine the position of the steering wheel and/or a relative steering angle on the basis of the at least one measurement value.

Thus, on the basis of the current induced by the steering wheel electric motor, which has been transformed by the equivalent circuit into at least one measurement value, the axle control unit can cause a movement of the axle and thus the wheels of the vehicle by means of the axle electric motor. In other words, even in the event of a failure of the control electronics, the steering angle specified by the driver can be converted into a steering movement.

In one variant, the equivalent circuit has at least one branch, which comprises a comparator and a switching element, in particular a transistor, wherein the comparator is connected to the at least one current sensor and is designed to actuate the switching element when the current measured by the current sensor exceeds a predetermined threshold value.

As a result, individual branches of the equivalent circuit can be switched on depending on the measured current. Similarly, the influence of very small currents, which tend to be subject to higher relative errors, can be minimized.

In a further variant, the equivalent circuit, in particular the at least one branch, may have a capacitor, the voltage of which represents the measurement value.

Thus, in this variant, the equivalent circuit converts the current induced by the steering wheel electric motor into a voltage, which can then be used by the axle actuator to perform a steering movement.

The equivalent circuit may have a voltage source that is connected to the capacitor via the switching element when the switching element is actuated.

Thus, the capacitor is charged by means of the voltage source as long as the switching element is actuated, especially if the current measured by the current sensor exceeds the predetermined threshold value.

Furthermore, the equivalent circuit, in particular the switching element, may be set up to discharge the capacitor if the current measured by the current sensor falls below the predetermined threshold value.

In this case, the capacitor can be discharged to a predetermined voltage value, which in particular corresponds to the value zero.

Thus, it can be ensured by means of the equivalent circuit that the capacitor provides a measurement value only if the current measured by the current sensor exceeds the predetermined threshold value.

In a further variant, the equivalent circuit may have multiple branches, in particular a branch for each phase of the steering wheel electric motor, wherein each branch contains a logic block connected to the comparator of the branch and the comparators of the at least one other branch, wherein the logic block is set up to discharge the capacitor when the measured current of the at least one other branch exceeds the threshold value.

In this way, the equivalent circuit can link multiple branches together in such a way that only that capacitor is charged which is assigned to a branch of the equivalent circuit, the current sensor of which is currently measuring a current that exceeds the threshold value. In this way, in particular in the presence of multiple phases of the steering wheel electric motor, a single phase can be selected and converted into at least one measurement value.

In addition, it can be determined by means of the comparator whether a positive or negative half wave of the current signal is present. This allows the equivalent circuit to be executed in such a way that only the positive or negative half wave has to be used for the determination of the measurement value, which simplifies the procedure.

The steering wheel actuator can have a steering wheel control unit connected to the control unit for data exchange.

In normal operation of the steer-by-wire steering system, the steering wheel control unit and the axle control unit communicate with each other in order to convert movements of the steering wheel into a steering movement.

In addition, the steering wheel control unit and the axle control unit can check each other to detect any malfunction of one or both control units.

Information about the movement of the steering wheel can be obtained by means of the sensors assigned to the steering wheel, for example an angle sensor and/or a torque sensor. The information obtained by means of the sensors is then processed by the steering wheel control unit and transmitted to the axle control unit, as long as there is not a complete failure of the steering wheel control unit.

The object of the invention is further achieved by a method for operating a steer-by-wire steering system, which has a steering wheel actuator with a steering wheel electric motor and a steering wheel control unit, an axle actuator with an axle electric motor and an axle control unit and an equivalent circuit, wherein the method includes the following steps:

Checking whether there is a malfunction of the steering wheel control unit, in particular by the axle control unit;

Measuring the current induced by the steering wheel electric motor by the equivalent circuit and providing a measurement value depending on the induced current;

Obtaining at least one measurement value from the equivalent circuit by the axle control unit; and Controlling the steering movement of the axle by the axle control unit by means of the axle electric motor depending on the at least one obtained measurement value if there is a malfunction.

Checking a malfunction of the steering wheel control unit can be carried out by means of the steering wheel control unit itself as well as by means of the axle control unit.

A malfunction may also only be a partial failure of the steering wheel control unit. The steering wheel actuator may comprise multiple sensors, which measure a rotation angle of the steering wheel and/or a torque applied to the steering wheel, for example. A malfunction may also correspond to the failure of at least one of these sensors.

If the steering wheel electric motor has multiple phases, a measurement value is provided in particular for each phase of the steering wheel electric motor. Thus, any phase of the steering wheel electric motor can be used by the axle actuator in the event of a malfunction.

In one variant, each phase is assigned a capacitor, wherein the capacitor is charged, especially linearly, when the current of the phase exceeds a predetermined threshold value.

Thus, the magnitude of the time difference between two zero passes of a certain phase of the steering wheel electric motor can be determined from the charge of the capacitor.

The at least one measurement value can be a voltage, in particular the voltage of the corresponding capacitor.

In a further variant, the position of the steering wheel and/or a relative steering angle is/are determined by the axle control unit on the basis of the at least one measurement value.

By turning the steering wheel, the steering wheel electric motor can induce an alternating current, in particular a three-phase alternating current. The method according to the invention allows the evaluation of the profile of the curve of the current signal that is induced in this way. The angle of rotation of the steering wheel can therefore be determined from the current signal.

This will make it possible for the movement of the steering wheel electric motor and the axle electric motor to be coordinated. Ideally, the phases of the steering wheel electric motor and the axle electric motor run synchronously, but the phases can also differ within a certain tolerance range.

At the same time, no current is induced when the steering wheel is stationary, so that this case can also be reliably detected and unwanted steering movements can be prevented.

BRIEF DESCRIPTION OF THE DRAWINGS

Further advantages and properties of the invention result from the following description and the drawings. In the figures.

DESCRIPTION

Figure 1:
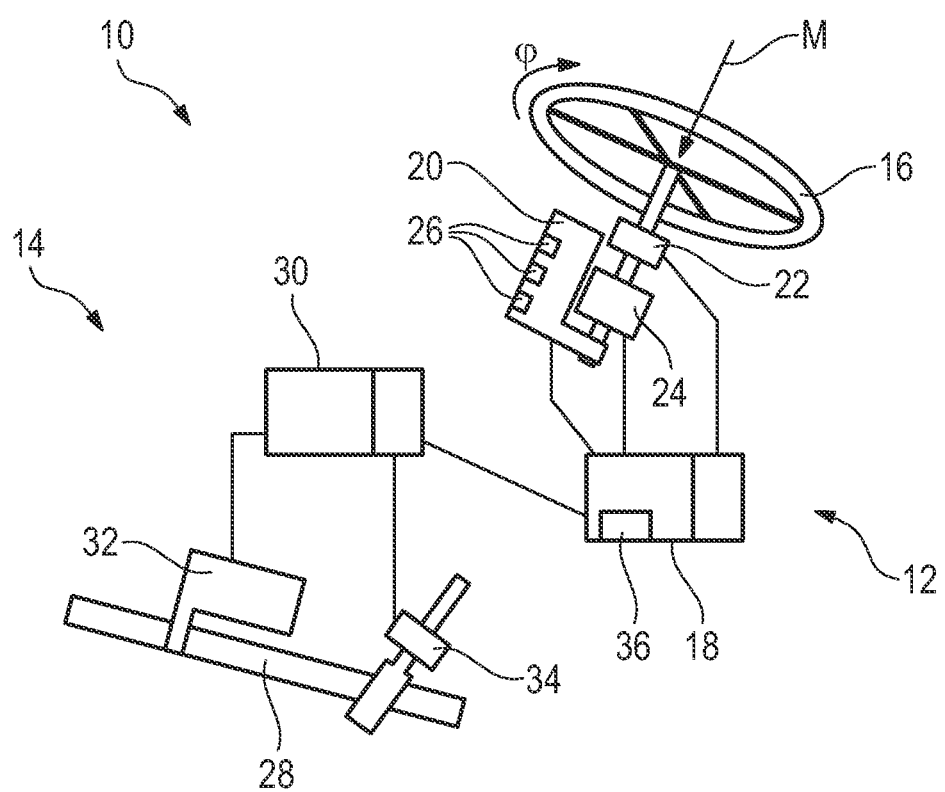
FIG. 1 shows a schematic representation of a steer-by-wire steering system according to the invention.

In FIG. 1, a steer-by-wire steering system 10 according to the invention is shown, with a steering wheel actuator 12 and an axle actuator 14.

The steering wheel actuator 12 is coupled to a steering wheel 16 of a (not shown) vehicle and comprises a steering wheel control unit 18 and a steering wheel electric motor 20.

The steering wheel 16 is also monitored by an angle sensor 22 and a torque sensor 24, by means of which a steering angle φ and a torque M applied to the steering wheel 16 can be determined. The angle sensor 22 and the torque sensor 24 are connected to the steering wheel control unit 18, which can process the information received from the sensors 22, 24.

In addition, the control unit 18 is connected to the steering wheel electric motor 20. The steering wheel electric motor 20 can also perform a steering movement of the steering wheel 16.

The steering wheel electric motor 20 also has multiple current sensors 26, which are in particular Hall sensors. The current sensors 26 are designed to measure the current of each phase of the steering wheel EM 20.

The axle actuator 14 acts on one axle of the vehicle, in the embodiment shown on the rack 28 of the front axle of the vehicle, and comprises an axle control unit 30 and an axle electric motor 32.

The position of the axle or the rack 28 can be monitored by means of a position sensor 34, which is connected to the axle control unit 30.

During the normal operation of the steer-by-wire steering system, the steering movement of the driver is detected by means of the angle sensor 22 and the torque sensor 24, is processed by the steering wheel control unit 18 and corresponding data are transmitted to the axle control unit 30. The axle control unit 30 controls the axle electric motor 32 based on the transmitted data, whereby a movement of the axle or the rack 28 is generated and thus a steering movement of the vehicle is performed.

In the case of a partial or complete failure of the steering wheel actuator 12, the method according to the invention for operating the steer-by-wire steering system 10 is used.

For this purpose, an equivalent circuit 36 is used, which is arranged in the steering wheel control unit 18 in the embodiment shown. In principle, however, the equivalent circuit 36 could also represent a separate component of the steer-by-wire steering system or could be formed in the axle actuator 14.

A malfunction of the steering wheel control unit 18 is determined in particular by the axle control unit 30 (step S1 in FIG. 4), for example by the fact that the axle control unit 30 is no longer receiving information of the angle sensor 22 and/or the torque sensor 24.

In this case, the electric motor 20 acts as a generator during a steering movement of the steering wheel 16, wherein the current sensors 26 can forward the induced current to the equivalent circuit 36 as an input signal.

Alternatively, the current sensors 26 can also be part of the equivalent circuit 36 instead of being part of the steering wheel electric motor 20. In this case, the equivalent circuit 36 is arranged so close to the steering wheel electric motor 20 that nevertheless a current is induced in the current sensors 26 by the movement of the steering wheel electric motor 20.

Figure 2:
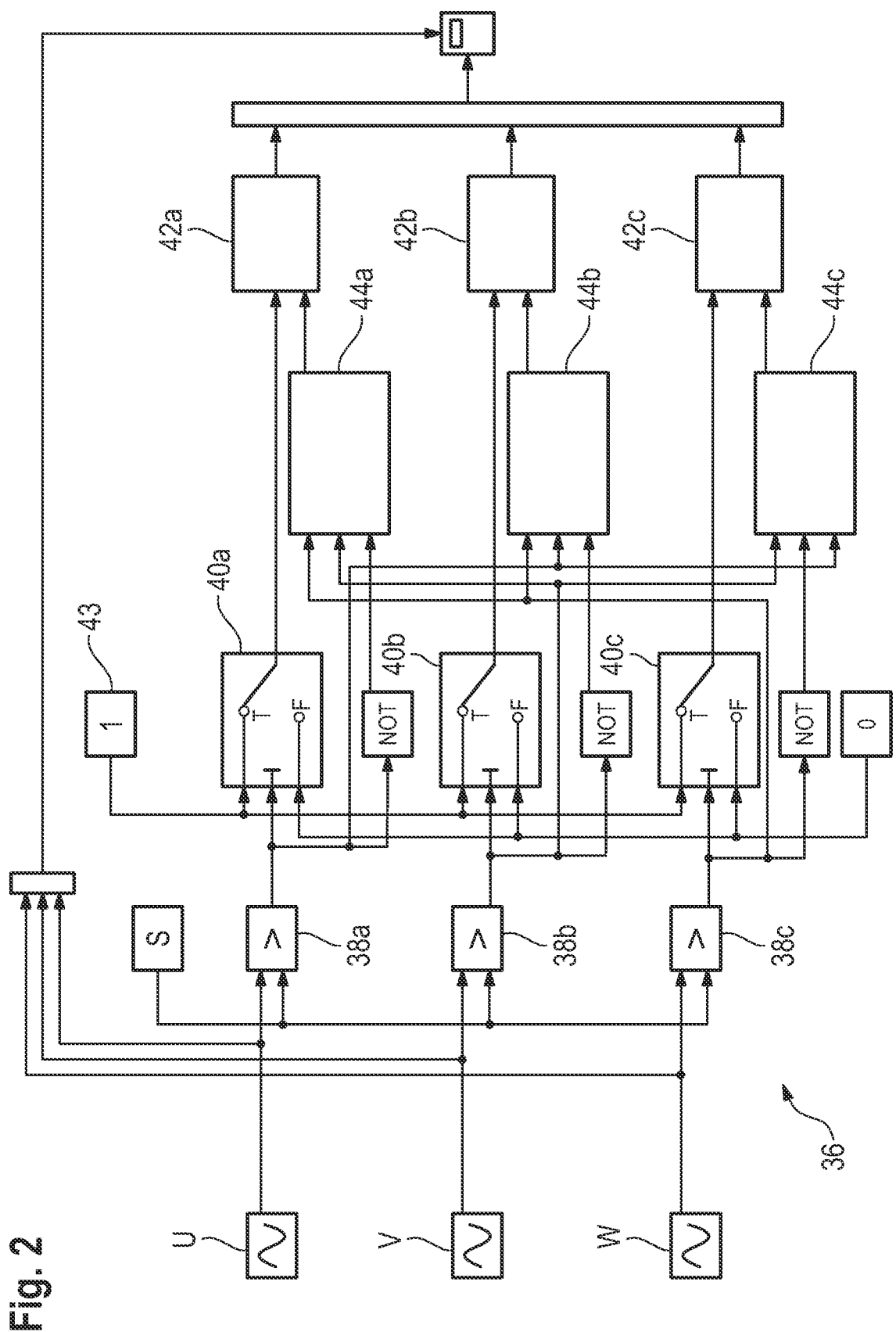
FIG. 2 shows an equivalent circuit of the steer-by-wire steering system from FIG. 1.

The equivalent circuit 36 is shown in detail in FIG. 2. In the embodiment shown here the equivalent circuit 36 has three branches, wherein each branch processes a current signal U, V, W. Basically, the equivalent circuit has in particular as many branches as the steering wheel electric motor 20 has phases.

The equivalent circuit 36 is purely a logic circuit, so no microcontroller and no software is necessary to operate the equivalent circuit 36. Thus, the equivalent circuit 36 can be operated even in the event of a failure of the steering wheel control unit 18. Accordingly, the current signals U, V, W are evaluated at least qualitatively.

The equivalent circuit 36 has three comparators 38a, 38b and 38c as well as three switching elements 40a, 40b and 40c, each assigned to a comparator 38a, 38b and 38c. In the embodiment shown here, the switching elements 40a, 40b, 40c are transistors.

The respective switching elements 40a, 40b and 40c are actuated when it is determined by means of the respective comparators 38a, 38b and 38c that the corresponding current signal U, V, W exceeds a predetermined threshold Value S.

In the embodiment shown, the threshold value S is 25% of the maximum amplitude of the current signal U, V, W, for example. The maximum value can be determined by the components used, the selected geometry of the components of the steer-by-wire steering system 10 or by means of a measurement.

The equivalent circuit 36 also has three capacitors 42a, 42b and 42c, the voltages of which represent the measurement values provided by the equivalent circuit 36.

The capacitors 42a, 42b and 42c are charged by means of a voltage source 43, wherein the voltage source 43 is connected to the capacitors 42a, 42b 42c via the respective switching element 40a, 40b, 40c. The voltage source 43 charges each of the capacitors 42a, 42b and 42c which belong to the branches of the equivalent circuit 36, the switching element 40a, 40b and 40c of which is currently actuated.

Accordingly, the respective capacitor 42a, 42b and 42c is charged only if the current signal U, V, W belonging to the respective branch exceeds the threshold value S.

In addition, the equivalent circuit 36 has logic blocks 44a, 44b and 44c, each connected to all comparators 38a, 38b and 38c. In addition, the logic blocks 44a, 44b and 44c are connected to the respective capacitors 42a, 42b and 42c.

The logic blocks 44a, 44b and 44c are used to discharge the associated capacitors 42a, 42b and 42c to a predetermined voltage value, in particular to completely discharge them, when the current signal of one of the other branches of the equivalent circuit 36 exceeds the threshold value S. This eliminates the need to evaluate the negative half waves of the current signals U, V, W.

Figure 3:
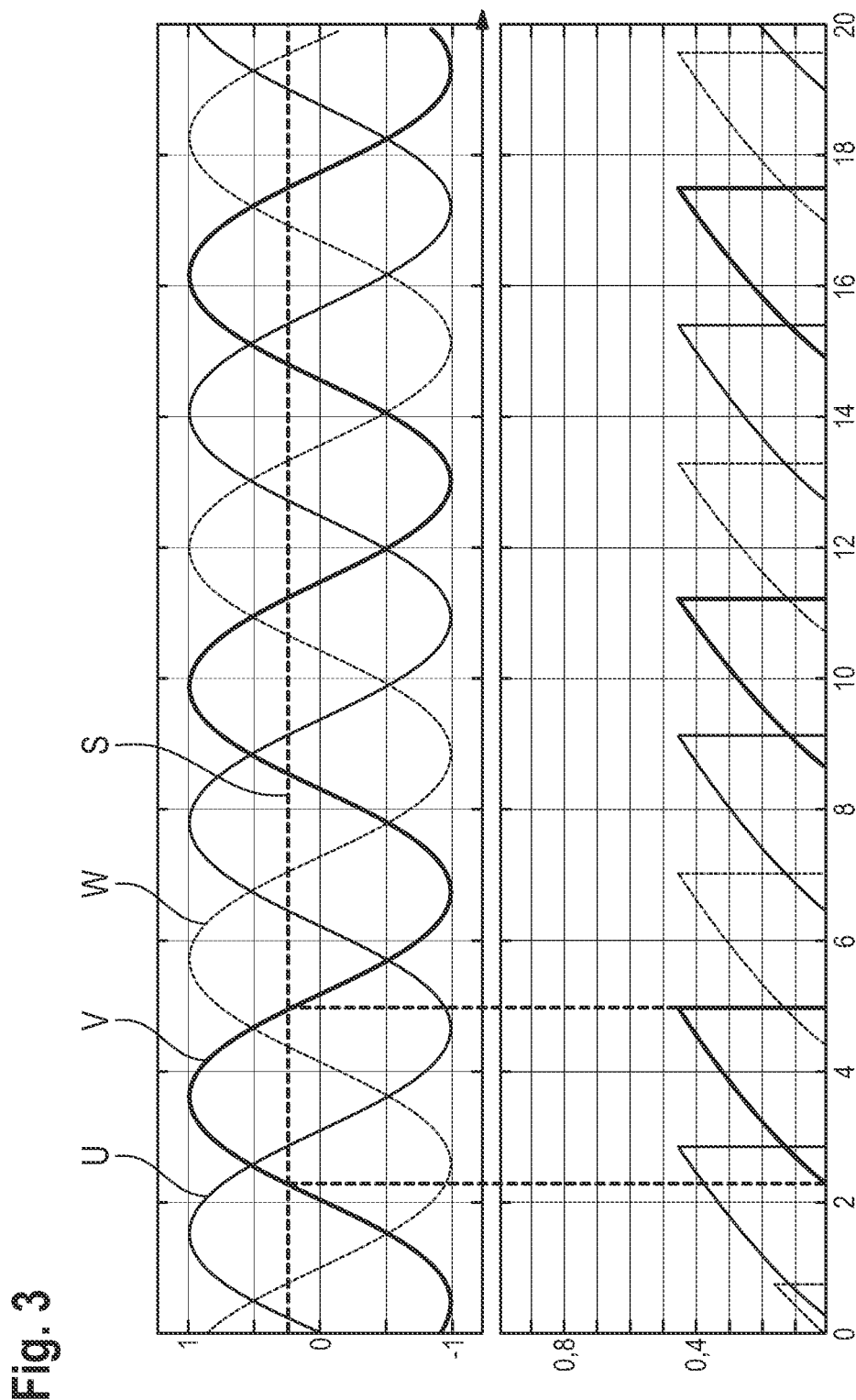
FIG. 3 shows diagrams of the variation of several current signals and the measurement values produced from these current signals by means of the equivalent circuit from FIG. 2.

FIG. 3 illustrates the relationship between the current signals U, V, W and the capacitor charge. In the upper diagram, the three current signals U, V, W are shown against time. In addition, the threshold value S is shown.

As can be seen, the current signals U, V, W each describe a phase of the three-phase alternating current, which is detected by the current sensors 26 during a steering movement of the steering wheel 16.

In the lower diagram in FIG. 3, the voltages of the capacitors 42a, 42b and 42c assigned to the respective current signals U, V, W are shown against time.

As can be seen, the capacitors 42a, 42b and 42c are charged linearly over a period of time, which is determined by the fact that the corresponding current signal U, V, W is above the threshold value S. This region is shown as an example of the current signal V in FIG. 3.

As soon as the current signal U, V, W drops below the threshold value S, the corresponding capacitor 42a, 42b and 42c will discharge, as shown in FIG. 3.

In the variant shown in FIG. 3, two of the capacitors 42a, 42b and 42c can be charged simultaneously over a limited period of time. Via the logic blocks 44a, 44b and 44c, however, it is also possible, as previously described, that the capacitor, for example, the capacitor 42b, which was previously in the charging process, is immediately discharged as soon as another of the capacitors starts to charge, for example the capacitor 42c.

Figure 4:
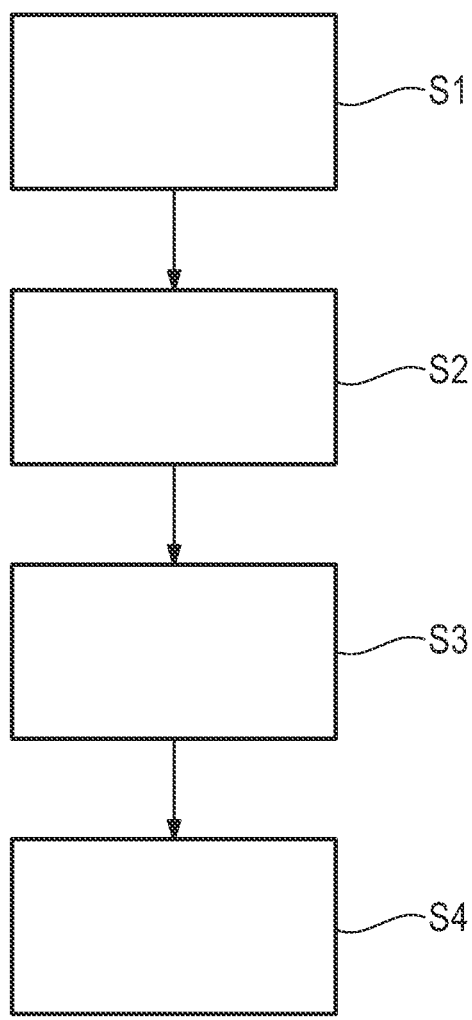
FIG. 4 shows a schematic flow diagram of the method according to the invention.

Ultimately, the current induced by the steering wheel electric motor 20 is measured by the equivalent circuit 36 and the voltages of the capacitors 42a, 42b and 42c are provided as measurement values depending on the induced current (step S2 in FIG. 4).

The axle control unit 30 can then receive the measurement values provided by the equivalent circuit 36 (step S3 in FIG. 4).

The axle control unit 30 can determine the position of the steering wheel 16 and/or the relative steering angle φ based on the provided measurement values. The corresponding conversion formula and value table are stored in the axle control unit 30.

The axle control unit 30 then controls the steering movement of the axle or rack 28 by means of the axle electric motor 32 depending on the obtained measurement values (step S4 in FIG. 4).

Thus, even in the event of a malfunction of the steer-by-wire steering system 10, a movement of the steering wheel is converted into a steering movement.

The invention claimed is:

1. A steer-by-wire steering system for a vehicle comprising:
   a steering wheel actuator (12) for moving and detecting movements of a steering wheel (16) of the vehicle, which has a steering wheel electric motor (20) connected to the steering wheel (16) of the vehicle,
   an axle actuator (14) for moving and detecting movements of wheels of an axle of the vehicle, which comprises an axle electric motor (32) and an axle control unit (30) and which is connected to the axle of the vehicle, and
   an equivalent circuit (36) comprised of a logic circuit to measure a current (U, V, W) induced by the steering wheel electric motor (20) and to provide the axle control unit (30) with at least one measurement value depending on the induced current (U, V, W) for controlling the axle electric motor (32).

2. The steer-by-wire steering system as claimed in claim 1, wherein the equivalent circuit (36) has at least one current sensor (26) which is assigned to a phase of the steering wheel electric motor (20), wherein the equivalent circuit (36) has as many current sensors (26) as the steering wheel electric motor (20) has phases.

3. The steer-by-wire steering system as claimed in claim 1, wherein as many measurement values are provided as the steering wheel electric motor (20) has phases.

4. The steer-by-wire steering system as claimed in claim 1, wherein the axle control unit (30) is set up to record the measurement value and to control the axle electric motor (32) on the basis of the measurement value, wherein the axle control unit (30) is set up to determine the position of the steering wheel and/or a relative steering angle (φ) on the basis of the at least one measurement value.

5. The steer-by-wire steering system as claimed in claim 1, wherein the equivalent circuit (36) has at least one branch that has a comparator (38a, 38b, 38c) and a switching element (40a, 40b, 40c), comprised of a transistor, wherein the comparator (38a, 38b, 38c) is connected to at least one current sensor (26) and is designed to actuate the switching element (40a, 40b, 40c) when the current (U, V, W) measured by the current sensor (26) exceeds a predetermined threshold value (S).

6. The steer-by-wire steering system as claimed in claim 1, wherein at least one branch of the equivalent circuit (36) has a capacitor (42a, 42b, 42c), the voltage of which represents the measurement value.

7. The steer-by-wire steering system as claimed in claim 5, wherein the equivalent circuit (36) has a voltage source (43) which is connected to the capacitor (42a, 42b, 42c) via the switching element (40a, 40b, 40c) when the switching element (40a, 40b, 40c) is actuated.

8. The steer-by-wire steering system as claimed in claim 5, wherein the switching element (40a, 40b, 40c), is set up to discharge the capacitor (42a, 42b, 42c) if the current (U, V, W) measured by the current sensor (26) is below a predetermined threshold value (S).

9. The steer-by-wire steering system as claimed in claim 5, wherein the equivalent circuit (36) has several branches, including a branch for each phase of the steering wheel electric motor (20), wherein each branch contains a logic block (44a, 44b, 44c) connected to the comparator (38a, 38b, 38c) of the branch and the comparators (38a, 38b, 38c) of another branch, wherein the logic block (44a, 44b, 44c) is set up to discharge the capacitor (42a, 42b, 42c) when the measured current (U, V, W) of the at least one other branch exceeds the threshold value (S).

10. The steer-by-wire steering system as claimed in claim 1, wherein the steering wheel actuator (12) has a steering wheel control unit (18) which is connected to the axle control unit (30) for data exchange.

11. A method for operating a steer-by-wire steering system (10), which has a steering wheel actuator (12) with a steering wheel electric motor (20) and a steering wheel control unit (18), an axle actuator (14) with an axle electric motor (32) and an axle control unit (30) and a logic circuit (36), wherein the method includes the following steps:
   checking whether there is a malfunction of the steering wheel control unit (18) by the axle control unit (30);
   measuring the current (U, V, W) induced by the steering wheel electric motor (20) by the logic circuit (36) and providing a measurement value depending on the induced current (U, V, W);
   obtaining at least one measurement value from the logic circuit (36) by the axle control unit (30); and
   controlling the steering movement of the axle by the axle control unit (30) by means of the axle electric motor (32) depending on the at least one measurement value obtained if there is a malfunction.

12. The method as claimed in claim 11, wherein a measurement value is provided for each phase of the steering wheel electric motor (20).

13. The method as claimed in claim 11, wherein each phase is assigned a capacitor (42a, 42b, 42c), wherein the capacitor (42a, 42b, 42c) is linearly charged, when the current (U, V, W) of the phase exceeds a predetermined threshold value (S).

14. The method as claimed in claim 11, wherein the at least one measurement value is a voltage of a corresponding capacitor (42a, 42b, 42c).

15. The method as claimed in claim 11, wherein the axle control unit (30) determines the position of the steering wheel and/or a relative steering angle $\varphi$ using the at least one measurement value.

\* \* \* \* \*